May 12, 1964  NORIKUNI HAYASHI  3,132,509
METHOD FOR DETERMINATION OF MECHANICAL TANGENT LOSS
AND DYNAMIC MODULUS IN THE DIRECT READING MANNER
Filed March 29, 1961
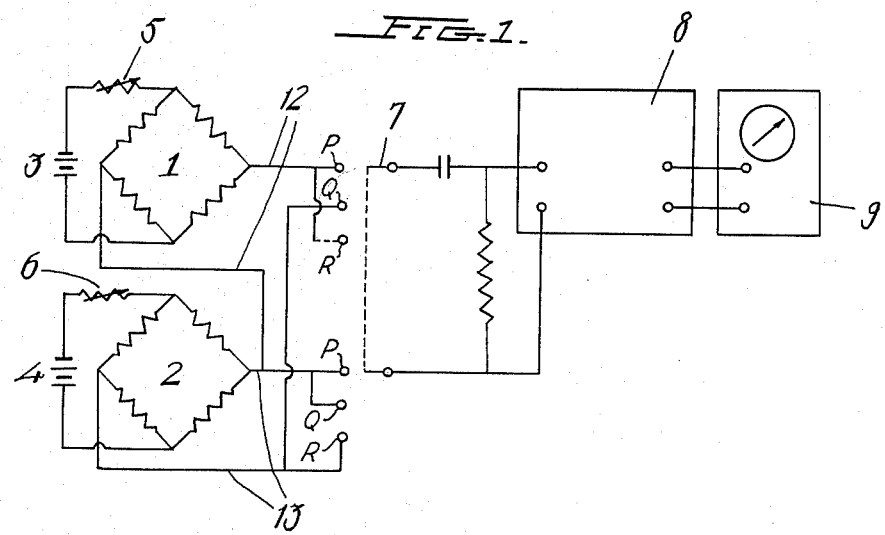
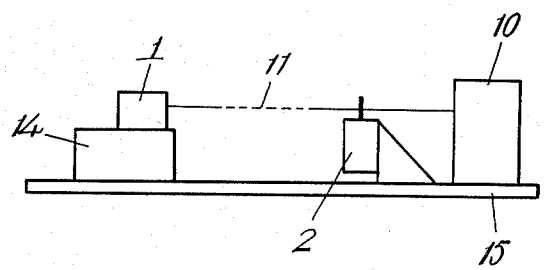
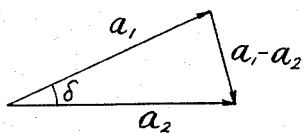
INVENTOR
NORIKUNI HAYASHI
BY McGlew and Toren
ATTORNEYS

United States Patent Office 3,132,509
Patented May 12, 1964

3,132,509
METHOD FOR DETERMINATION OF MECHANICAL TANGENT LOSS AND DYNAMIC MODULUS IN THE DIRECT READING MANNER
Norikuni Hayashi, 965 Sakurayama, Zushi-shi, Kanagawa-ken, Japan
Filed Mar. 29, 1961, Ser. No. 99,240
2 Claims. (Cl. 73—67.1)

The present invention relates to a novel method for determination of mechanical tan $\delta$ and dynamic modulus of high polymers and the like, and providing direct readings thereof.

It is the main object of the invention to provide a novel method of the above nature, by which the determination of mechanical tan $\delta$ and dynamic modulus can be made in a very easy and speedy manner.

Another object is to provide a novel method of the kind above referred to wherein conventional amplifiers are dispensed with. Therefore, troubles arising from phase shift effects and phase distortions, which are frequently encountered, are completely obviated.

Another object is to provide a novel method of the kind above referred to whereby the desired accurate values can be effectively obtained, even when the mechanical loss tangent to be determined is very small.

For realization of the above and other objects, the method according to the invention comprises: setting the material stock to be tested between first and second strain gages of the unbonded type; subjecting said stock to sinusoidal displacement; transforming said displacement by means of said first strain gage into electrical quantity in proportion to said displacement; converting by means of said second strain gage the thus generated force into the corresponding electrical quantity; direct mixing these both electrical outputs; and reading the electrical resultant through a selective amplifier by a meter to provide direct readable values.

Various further and more specific objects, features and advantages of the invention will appear from the description given below, taken in connection with the accompanying drawing illustrating by way of example a preferred embodiment of this invention.

In the drawing:

FIGURE 1 is a circuit diagram showing the electrical components of a device adapted to carry out the invention;

FIGURE 2 is a diagrammatic representative of the arrangement according to the invention including strain gages and a driver for imparting sinusoidal stresses to the material stock to be tested; and FIGURE 3 is a vector diagram for illustrating the principles underlying the invention.

Now referring to the drawing, especially FIGURE 2 thereof, reference numeral 1 denotes an electric resistance strain gage of the unbonded type mounted on an adjustably movable frame 14 while 2 represents another electric resistance strain gage mounted on a stationary frame 15; strain gage 2 being the unbonded type. After the frame 14 has been adjusted and rigidly fixed or locked to a frame 15, a stock, or sample 11, of material to be tested consisting, for example, of a high polymer and shaped in a fibre, filament, thread, strip or membrane, as the case may be, is fixed between the above mentioned two strain gages 1 and 2. Reference numeral 10 denotes a driver designed and arranged to cause sinusoidal stresses in the testing sample 11 to take place. The first strain gage 1 operates to measure the stresses and the second strain gage 2 measures the variable strain developed in the sample 11. The variable electrical outputs from the both strain gages 1—2 are taken out through conductors 12 and 13, respectively (see FIG. 1). Reference number 8 represents a selective amplifier to amplify the output voltages from the both gages, separately or differentially, as desired by an operator. A meter 9, preferably a voltmeter, represents the output in its direct readable form.

In operation, sinusoidal periodical forces derived from the driver 10 are imparted to the sample 11, and the first strain gage 1 mounted on the movable frame 14 measures thus the stresses induced in the sample, while the second strain gage 2 mounted on the stationary frame 15 operates in response to the distortions thus developed in the sample, delivering sinusoidal voltage outputs from these gages depending upon the stresses and distortions. These electrical outputs are taken out through conductors 12 and 13, respectively.

As is well known to those skilled in the art, the stresses and distortions thus induced and developed, respectively, in the sample provide a phase difference, generally denoted by $\delta$, depending on the rheological characteristics thereof. Correspondingly, there will be the same amount of phase difference between the electrical outputs from the both gages 1 and 2. FIGURE 3 is a vector diagram of these outputs $a_1$ and $a_2$, respectively, the phase difference $\delta$ therebetween being also shown.

In the arrangement shown in FIGURE 1 when a transfer switch 7 is manually transferred to a first position P, the electrical output corresponding to vector $a_1$ is supplied to and amplified in the amplifier 8 and the amplified current may be read off at the meter 9. In the similar way, when the switch 7 is transferred to a second position Q, the output corresponding to vector $a_2$ may be amplified and then represented at the meter 9. Also, when the transfer switch is transferred to a third position R, the vector difference $a_1-a_2$ is readable at the meter 9. If, then, by manipulating variable resistors 5 and 6 for adjustment of direct current voltages supplied from batteries 3 and 4 to strain gages 1 and 2 so as to establish the relation $$|a_1|=|a_2|=|a|$$

the following relation will be obtained from consideration of FIGURE 3, viz.

$$|a_1-a_2|=2|a|\sin\frac{\delta}{\gamma}$$

Thus, it will be noted, that when a further relation $|a|=|$ is established and the transfer switch 7 is transferred to the position R, the value $|a_1-a_2|$ can provide the value of $$2\sin\frac{\delta}{2}$$

In this way, when these values are calibrated in terms of tan $\delta$, the required mechanical loss tangent or tan $\delta$ can be represented in a direct readable manner.

As is commonly known, dynamic modulus G is represented by the following formula:

$$G=\frac{F}{\Delta l}\cdot\frac{l}{A} \tag{1}$$

wherein, F is the amplitude of a tensile force applied to the sample; $\Delta l$ is the amplitude of the elongation induced in the sample by the force; $l$ the length of the sample; and A the cross section of the sample.

Now assuming that $e_1$ and $e_2$ are voltage outputs from the strain gages 1 and 2, respectively, and $E_1$ and $E_2$ represent voltage imputs to these gages, respectively, the following relations about F and $l$ are established:

$$F=\frac{e_1}{E_1 f_1} \qquad \Delta l=\frac{e_2}{E_2 f_2} \tag{2}$$

wherein, $f_1$ and $f_2$ are calibration factors, respectively. If the above Formulae 2 are inserted into the Formula 1, then:

$$G=\frac{f_2 e_1 l}{f_1 e_2 A}\cdot\frac{E_2}{E_1} \tag{3}$$

As already mentioned, $e_1$ and $e_2$ are made equal to each other (since $|a_2|=|a_2|$), when measuring tan $\delta$, then, I obtain $$G=\frac{f_2 l}{f_1 A}\cdot\frac{E_2}{E_1} \quad (4)$$

FIGURE 3 is a vector representation of the outputs from the electric resistance strain gages, wherein $a_1$ and $a_2$ are proportional to the force and displacement, respectively.

In the above Formula 4, then term $f_2 l/fA$ is a constant, which depends upon the kind and nature of the material to be tested, as well as of the strain gages employed, and thus can be determined before the measurement. Thus, if the both values $E_1$ and $E_2$ are measured with maximum attainable accuracy, the dynamic modulus G can be easily determined. In the above procedure, the operation for establishing the relation:

$$|a_1|=|a_2|=1$$

or $$e_1=e_2=1$$

is easily carried into effect by manipulating suitably the variable resistors 5 and 6. In this way the introduction of errors caused by a gradual variation in a long extended service of the amplifiers, can be effectively avoided.

While in the conventional way to determine the value of the mechanical loss tangent of a test material, such as the resonance curve method, the Lissajous' figure method or the like, highly complicated and time-consuming operations are required, the measuring process according to the invention provides thus a direct readable, highly simple and efficient measure for the determination of the above mentioned value.

According to the process known per se, wherein the outputs from a couple of electrical resistance strain gages are once amplified, and then mixed with each other, troubles are usually encountered by possible displacement in current phase as well as amplitude distortion caused by amplifiers, which troubles are more distinct with smaller values of the mechanical loss tangent to be determined, thus giving rather inferior measuring results. On the contrary, according to the invention, two electrical outputs are direct mixed with each other without being amplified, so that highly accurate results can be obtained, even if the value of the mechanical loss tangent is relatively small.

Although a certain particular embodiment of the invention has been herein disclosed for the purpose of explanation, various further modifications thereof, after study of this specification, will be apparent to those skilled in the art to which the invention pertains. Reference should accordingly be had to the appended claims in determining the scope of the invention.

What is claimed and desired to secure by Letters Patent is:

1. A method for direct determination of the mechanical tangent loss and dynamic modulus of high polymers and the like, comprising the steps of fixing an elongated piece of the test material between first and second fixedly mounted and longitudinally spaced strain gauges; subjecting the material to longitudinal oscillation; applying a first input D.-C. potential to said first strain gauge; applying a second D.-C. input potential to said second gauge; measuring the output potential of said first strain gauge to determine the magnitude of a first vector component representative of the applied stress; measuring the output potential of said second strain gauge to determine the magnitude of a second vector component as a function of the distortion of said material; adjusting both D.-C. input potentials until said magnitudes are equal to each other and to unity; then separately measuring the thus adjusted D.-C. input potentials and determining the ratio of said second adjusted input potential to said first adjusted input potential as a function of the dynamic modulus; then directly comparing the two output potentials to determine the phase displacements thereof as a measure of the angular displacements of said vector components to determine the mechanical loss tangent.

2. The method defined in claim 1, in which said output potentials are compared directly with each other in advance of amplification of the phase difference therebetween.

References Cited in the file of this patent
UNITED STATES PATENTS 2,316,253    Keinath               Apr. 13, 1943
2,733,596    Painter                Feb. 7, 1956